March 17, 1931.    J. L. DRAKE    1,796,836
SHEET GLASS APPARATUS
Filed March 2, 1927
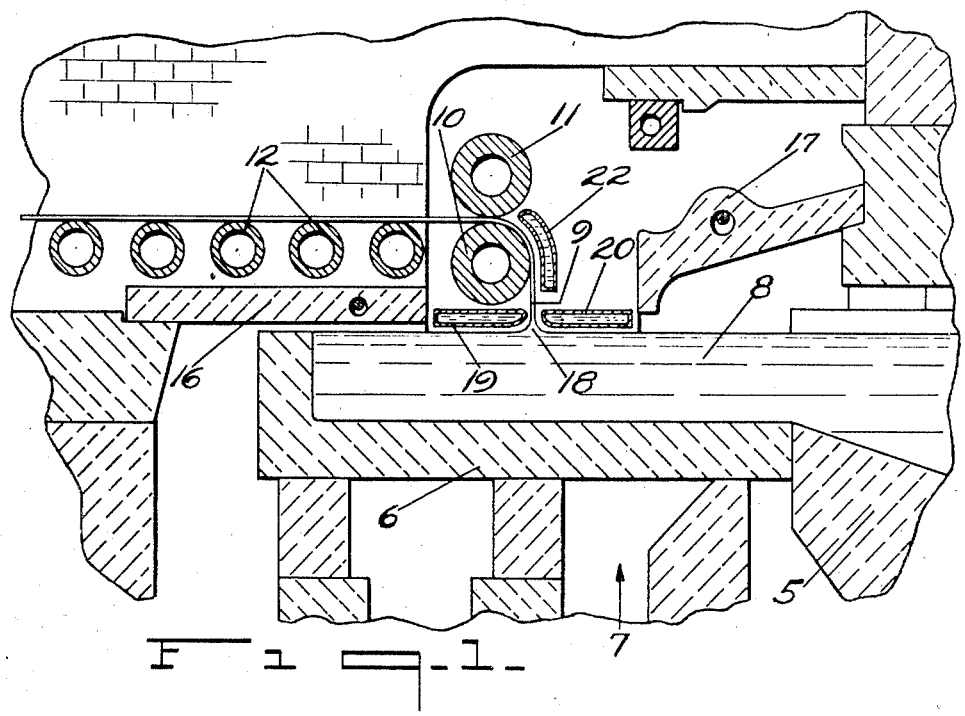
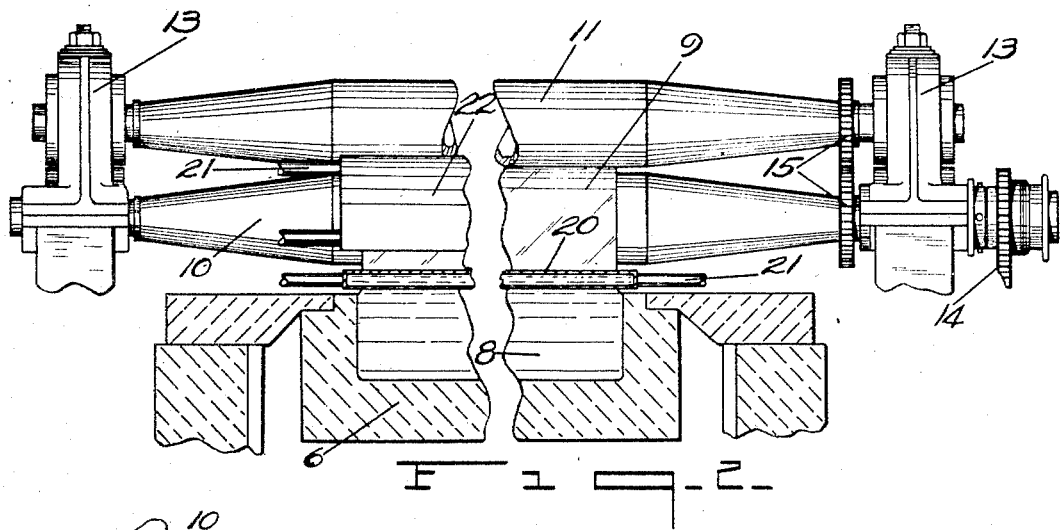
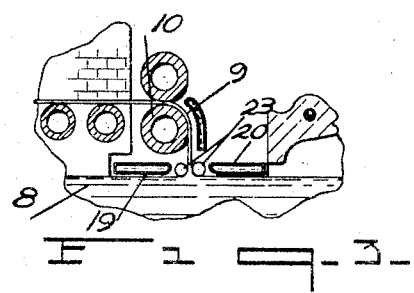
Inventor
John L. Drake
By Frank Fraser
Attorney Patented Mar. 17, 1931

1,796,836

UNITED STATES PATENT OFFICE

JOHN L. DRAKE, OF TOLEDO, OHIO, ASSIGNOR TO LIBBEY-OWENS FORD GLASS COMPANY, OF TOLEDO, OHIO, A CORPORATION OF OHIO

SHEET-GLASS APPARATUS

Application filed March 2, 1927. Serial No. 171,958.

The present invention relates to sheet glass apparatus, and has particular reference to the continuous production of sheet glass.

An important object of the invention is to provide in sheet glass apparatus, a receptacle containing a mass of molten glass from which a sheet can be continuously produced, and means arranged above the molten glass in said receptacle for protecting the molten glass adjacent the base or meniscus of the sheet from the atmosphere.

A further object of the invention is to provide in sheet glass apparatus, a receptacle which may be continuously replenished with molten glass from a tank furnace and including means positioned above the receptacle for protecting the surface of the molten glass adjacent the base or meniscus of the sheet from the atmosphere, and means for controlling the temperature of said protecting means.

A further object of the invention is to provide in an apparatus of this nature, a receptacle containing a mass of molten glass from which the sheet may be drawn and including means whereby an equalized cooling of the opposite sides of said sheet can be effected.

A still further object of the invention is to provide in sheet glass apparatus including a receptacle containing a mass of molten glass from which a sheet may be drawn, and including means for protecting the sheet to a large extent from disturbing atmospheric changes during its formative period.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through a portion of a sheet glass apparatus illustrating the present invention, Fig. 2 is a transverse section through the receptacle or draw pot, and Fig. 3 is a detail section showing a slightly modified form of the present invention.

The present invention relates particularly to a continuous system wherein a sheet may be continuously drawn from a mass of molten glass contained in a suitable receptacle or draw pot. Heretofore, in this type of apparatus, it has been customary to expose a considerable portion of the surface of the molten glass, from which the sheet is drawn, to the atmosphere. I have found in actual practice, that conditions can be disturbed and difficulty had with the production of a high quality of sheet, by the mere opening or closing of a door or window in the building in which the machine is located. It is an aim, therefore, in the present invention to provide an apparatus wherein desirable conditions may be set up and maintained in a manner that the molten glass and sheet are practically free from changes due to atmospheric changes.

In the drawings, the numeral 5 designates a tank furnace having associated therewith a receptacle or draw pot 6 arranged in open communication with the furnace, the pot being supported above a heating chamber 7 and supplied with molten glass 8. A sheet 9 may be continuously drawn from the molten mass 8, and this sheet is preferably drawn in the vertical plane initially, and then deflected into the horizontal plane over a bending member or roll 10 and passed between this roll and a second roll 11. The sheet is then carried along by and upon a series of rolls 12 through an annealing leer where it is gradually reduced to room temperature.

The rolls 10 and 11 are adapted to be internally cooled by circulating a suitable cooling medium therethrough, and are journaled at their opposite ends in bearings 13. One of the rolls is adapted to be positively driven through the medium of a suitable chain and sprocket connection 14, and this rotary motion is adapted to be imparted to the other roll through the intermeshing gears 15.

Arranged above the receptacle 6 at opposite sides of the sheet are lip tiles 16 and 17 which tend to force any heat currents escaping from the heating chamber 7 or furnace 5 downwardly onto the surface of the molten glass 8.

In carrying out the present invention, there is provided at the opposite sides of the sheet 9 closely adjacent the base or meniscus 18 thereof, a pair of horizontal coolers 19 and 20 which are adapted to cover substantially the entire surface of the molten glass not covered by the lip-tiles 16 and 17. The temperature of these coolers is preferably controlled by circulating a suitable cooling medium such as water therethrough, and this cooling medium may enter and exit through pipes 21. The cooling members are of a substantially greater width than height and are positioned with one of their larger faces parallel with but spaced from the surface of the molten glass so that they will protect the surface of the molten glass adjacent the base or meniscus of the sheet from drafts and other atmospheric changes.

Associated with the rolls 10 and 11 is a cooling member 22 which is transversely arcuated as shown in Fig. 1, and the temperature of which is also adapted to be controlled by circulating a suitable cooling medium therethrough. The provision of this cooling member, in conjunction with the roll 10, serves to effect an equalized cooling of the opposite sides of the sheet during the deflecting thereof. In other words, the side of the sheet adjacent the cooling member 22 will be cooled an amount equal to the cooling of the surface or side of the sheet contacting with the roll 10. The area of contact of the roll 11 with the sheet 12 is so small that this roll 11 will not materially affect the cooling of said sheet, but if desired, the temperature of the cooling member 22 can be so controlled that the combined cooling action of the same and the roll 11 on the one side of the sheet will be equal to the cooling effect of the roll 10 on the opposite side of the sheet.

Also, the coolers 19 and 20, together with the roll 10 and cooling member 22, will serve to protect the sheet to a large extent from disturbing atmospheric changes during the formative period thereof.

In Fig. 3, wherein has been shown a somewhat modified form of the present invention, it will be noted that suitable means 23, preferably in the form of knurled rollers are positioned at opposite edges of the sheet to assist in maintaining the same to width. These knurled rollers or other width maintaining means may or may not be used, as preferred.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, means for drawing a sheet therefrom, means for cooling said means, and an internally cooled member associated with the drawing means for effecting an equalized cooling of the opposite sides of said sheet.

2. In sheet glass apparatus, a receptacle containing a mass of molten glass, means for drawing a sheet therefrom and deflecting it from the vertical into the horizontal plane, said means absorbing heat from the sheet, and an internally cooled member associated with said drawing means for effecting an equalized cooling of the opposite sides of said sheet during the deflecting thereof.

3. In sheet glass apparatus, a receptacle containing a mass of molten glass, means for drawing a sheet therefrom, said means absorbing heat from the sheet, and an internally cooled shield arranged at either side of the sheet for protecting the surface of the molten glass in the receptacle from the atmosphere, combined with an internally cooled member associated with said drawing means for effecting an equalized cooling of the opposite sides of said sheet.

4. In sheet glass apparatus, a receptacle containing a mass of molten glass, means for drawing a sheet therefrom and deflecting it from the vertical into the horizontal plane, means for cooling said means, shields arranged at opposite sides of the sheet for protecting the surface of the glass in the receptacle from the atmosphere, and means for controlling the temperature of said shields, combined with an internally cooled member associated with said drawing means for effecting an equalized cooling of the opposite sides of the sheet during the deflecting thereof.

5. In sheet glass apparatus, a receptacle containing a mass of molten glass, means for drawing a sheet therefrom, lip tiles covering a portion of the receptacle at opposite sides of the sheet, and horizontal internally cooled members of greater width than height covering those portions of the receptacle not covered by said lip tiles.

6. In sheet glass apparatus, a receptacle containing a mass of molten glass, means for drawing a sheet therefrom, lip tiles covering a portion of the receptacle at opposite sides of the sheet, members of substantially greater width than height arranged at opposite sides of the sheet and covering those portions of the receptacle not covered by the lip tiles, and means for controlling the temperature of said members.

7. In sheet glass apparatus, a receptacle containing a mass of molten glass, means for drawing a sheet therefrom, means for cooling said means, lip tiles covering a portion of the receptacle at opposite sides of the sheet, and internally cooled members covering those portions of the receptacle not covered by said lip tiles, in combination with a cooler associated with said drawing means for effecting an equalized cooling of the opposite sides of the sheet during the drawing thereof.

8. In sheet glass apparatus, a receptacle containing a mass of molten glass, a pair of rolls for drawing a sheet therefrom and deflecting it from the vertical into the horizontal plane, said rolls absorbing heat from the sheet, lip tiles covering a portion of the molten glass in the receptacle at each side of the sheet and adapted for directing heat currents onto the molten glass, coolers arranged at opposite sides of the sheet covering those portions of the glass not covered by the lip tiles, and means for controlling the temperature of said coolers, combined with a transversely arcuated cooling member associated with said rolls for effecting an equalized cooling of the sides of the sheet during the deflecting thereof.

9. In sheet glass apparatus, a receptacle containing a mass of molten glass, means for drawing a sheet therefrom, means engaging the opposite edges of said sheet for maintaining the same to width, and internally cooled members arranged at opposite sides of the sheet for protecting the surface of the molten glass in the receptacle from the atmosphere, said members being of substantially greater width than height and each having one of its larger surfaces arranged parallel to but spaced from the surface of the molten glass.

10. In sheet glass apparatus, a receptacle containing a mass of molten glass, means for drawing a sheet therefrom, said means absorbing heat from the sheet, means engaging the opposite edges of said sheet for maintaining the same to width, and internally cooled members arranged at opposite sides of the sheet for protecting the surface of the molten glass in the receptacle from the atmosphere, combined with an internally cooled member associated with said drawing means for effecting an equalized cooling of the opposite sides of the sheet.

11. In sheet glass apparatus, a receptacle containing a mass of molten glass, means for drawing a sheet therefrom, one side of the sheet contacting with said drawing means which absorbs heat therefrom, and means for absorbing heat from the opposite side from that portion of the sheet in contact with said drawing means.

12. In sheet glass apparatus, a receptacle containing a mass of molten glass, means for drawing a sheet therefrom, one side of the sheet contacting with said drawing means which absorbs heat therefrom, and an internally cooled member for absorbing heat from the opposite side of that portion of the sheet in contact with the drawing means.

13. In sheet glass apparatus, a receptacle containing a mass of molten glass, an internally cooled roll for drawing a sheet therefrom, one side of the sheet contacting therewith, and an internally cooled member arranged at the opposite side of the sheet and spaced therefrom for effecting equalized cooling of the opposite sides of that portion of the sheet in contact with the drawing means.

14. In sheet glass apparatus, a receptacle containing a mass of molten glass, a pair of superimposed rolls arranged above the molten glass and spaced from one another, the sheet being drawn upwardly and deflected about the lower roll in contact therewith and passed between said rolls, means for cooling the lower roll, and an internally cooled member arranged to absorb heat from the opposite side of that portion of the sheet in contact with said roll.

15. In sheet glass apparatus, a receptacle containing a mass of molten glass, a pair of rolls arranged thereabove in superimposed relation and spaced from one another, the glass being drawn upwardly and deflected about the lower roll in contact therewith and passed between said rolls, lip tiles covering a portion of the molten glass in the receptacle at each side of the upwardly moving glass, and horizontal internally cooled shields of greater width than height arranged at opposite sides of the upwardly moving glass inwardly of the lip tiles and covering those portions of the molten mass not covered by said lip tiles.

Signed at Toledo, in the county of Lucas and State of Ohio, this 26th day of February, 1927.

JOHN L. DRAKE.